United States Patent [19]

Story

[11] Patent Number: 5,097,580
[45] Date of Patent: Mar. 24, 1992

[54] APPARATUS FOR INSTALLING AND REMOVING VALVE STEMS

[76] Inventor: Albert J. Story, 1211 Forest Parkway, Lake City, Ga. 30260

[21] Appl. No.: 547,052

[22] Filed: Jul. 2, 1990

[51] Int. Cl.$^5$ .............................................. B23P 19/04
[52] U.S. Cl. ..................................................... 29/221.5
[58] Field of Search ...................... 29/221.5, 222, 252, 29/235, 213, 278, 280, 282, 283, 450, 451

[56] References Cited

U.S. PATENT DOCUMENTS

| | | | |
|---|---|---|---|
| 2,438,642 | 3/1948 | Martin | 29/252 |
| 3,750,258 | 8/1973 | Sampo. | |
| 4,765,048 | 8/1988 | Hokanson. | |
| 4,807,343 | 2/1989 | Wadsworth. | |

Primary Examiner—Robert C. Watson
Attorney, Agent, or Firm—Hopkins & Thomas

[57] ABSTRACT

An apparatus for removing and installing a valve stem into an opening defined by a rim. An inoperable valve stem is removed from the rim from the outside of the rim, and an operable valve stem is installed into the rim from the outside of the rim, thus avoiding separating the tire side wall from the rim during removal and installation of the valve stem. The inserter comprises a tool using pressurized fluid to force a piston and piston rod out of a chamber. A conventional valve stem is forced through the inserter and through the opening defined by a wheel or rim.

22 Claims, 3 Drawing Sheets

APPARATUS FOR INSTALLING AND REMOVING VALVE STEMS

BACKGROUND OF THE INVENTION

1. Field of the Invention

This invention relates to a method and apparatus for installing and removing valve stems from the valve stem opening defined by a vehicular wheel or rim. The apparatus for installing the valve stem both compresses the anchoring portion of the valve stem and simultaneously forces the valve stem under fluid pressure into the valve stem opening. Such valve stems can be readily removed from the opening by the insertion of the shaft of the valve stem removal tool through the central, axial portion of the valve stem, engaging a hook or grasping member into the anchoring portion of the valve stem and pulling the valve stem from the opening. The method for installing and removing valve stems disclosed herein utilizes each of these apparatuses.

2. Description of the Prior Art

With the advent of tubeless tires, the problem of providing suitable means to inflate the tire arose, since the elimination of the inner tube also eliminated the valve carried by the inner tube. To overcome this problem, valve stems were developed. The universal acceptance of tubeless tires has led to the utilization of a valve stem of basic or conventional configuration. This "conventional" valve stem includes an elastic, bulbous base portion which defines an annular channel. Bonded to this base portion is an upstanding metal cylinder housing the internal components of the valve. When these valve stems were first utilized, they were installed using simple-hand tools. Because of the bulbous shape of the base portion, which tapers upwardly toward the cylinder, these valve stems were originally installed by hand by removing the tubeless tire from the rim or by separating the tire side wall from the rim, and inserting the valve stem into the opening from the inner side of the wheel or rim wall. The upwardly tapering base portion facilitated the installation of the valve stem from the inner side wall. The valve stem was then grasped with a common hand tool, such as pliers, and pulled outwardly until the channel engaged the side wall of the rim defining the valve stem opening. Hand installation of the valve stems from the outside of the rim is very difficult to accomplish because of the rounded or bulbous shape of the valve stem opposite the tapered portion of the base.

Because of the time and labor required to break the tire bead, remove the inoperable valve stem from the inside of the rim and install the new valve stem from the inside of the rim, various devices were developed to install the valve stem from the outside of the rim. The basic principle of each of these devices is to compress the rounded, bulbous portion of the valve stem base while ramming the valve stem through the opening from the outside of the rim. U.S. Pat. No. 3,750,258 to Sampo discloses a hand powered insertion tool for tire valve stems. Although this tool compresses the valve stem base and forces the valve stem into the opening from the outside, a significant drawback is that the operator must align the tool with the opening and attempt to simultaneously compress the base and force the valve stem axially through the tool by ramming a handle downwardly and at an angle. Practically, this tool will not perform satisfactorily. U.S. Pat. No. 4,765,048 to Hokanson discloses a power assisted tool similar in design to that disclosed in the '258 patent. The principal difference is that the shaft portion is externally threaded to communicate with internal threads of an end cap. As the shaft is manually rotated, it is forced axially through the tool by the interaction of the threads. The valve stem retained on the lower portion of the shaft is then compressed and forced incrementally from the tool and into the valve stem opening. This tool has the drawback of manual operation which additionally leads to excess installation time and labor cost. Further, the valve stem, being compressed between the insertion tool side walls and the shaft, may turn with the shaft causing wear on the valve stem during insertion. Another valve stem inserter was recently developed and disclosed in U.S. Pat. No. 4,807,343 to Wadsworth. This inserter utilizes the components of a conventional caulking gun, and incrementally forces a push rod through the gun as a lever is manually biased. The valve stem is mounted to the end of the push rod and compressed by being forced through the tapering side wall of the barrel of the tool. The drawbacks of this device include the increased installation time resulting from the manual operation, the difficulty in applying force to the lever or trigger, and the incremental advancement of the valve stem which not only add to installation time and labor cost but can add to the stress or wear on the valve stem itself.

Further, these prior art devices do not disclose a method for removal of the used or inoperable valve stems prior to the insertion of the new valve stem. This is obviously a first step which must be accomplished prior to inserting a new valve stem in a previously inflated tubeless tire. Often in the prior art, the tire was removed from the rim or its side walls separated from the rim in order to pull the inoperable valve stem internally from the opening. This obviously negates the supposed advantage of the installation methods described in the prior art. Another frequently used method of removal is to insert a common tool, such as a screwdriver, between the bulbous, base portion of the valve stem and the rim side wall defining the opening, and attempting to force the valve stem outwardly using leverage. This often damages the opening, adversely affecting the seal of the subsequently installed valve stem. Still another method in the prior art used to remove inoperable valve stems is to grasp the cylindrical portion of the valve stem and pull the valve stem outwardly with enough force to rip the stem from the wheel. In this case, the bulbous, lower portion of the valve stem often shears from the upper portion and falls into the installation chamber between the tubeless tire and the wheel. This can cause, among other problems, difficulty in obtaining a perfect balancing of the wheels. This problem is increased as more valve stems are removed in this fashion.

The present invention overcomes many of the disadvantages of valve stems inserters of the prior art. As disclosed herein, the inserter of the present invention permits quick and certain valve stems installation, which can be accomplished by an individual of any strength, since the insertion tool does not require manual force for its actuation.

SUMMARY OF THE INVENTION

Briefly described, the present invention discloses a method for removing and for installing valve stems and the apparatus used in this method. The method disclosed includes removing the inoperable valve stem by applying outward force against the base portion of the valve stem and inserting a new valve stem by using compressed fluid to force the valve stem through tapering side walls, thereby compressing the valve stem so that it will be readily received in the rim opening. The apparatus for removing the valve stem includes an elongate shaft forming a grasping member at its lower end. A handle can be provided on the opposite end of the shaft to facilitate pulling the valve stem from the opening. The insertion tool or inserter includes a cylinder adapted to be pressurized, preferably with compressed air, to force a piston and piston rod through a tapering nosecone. A valve stem attached to the free end of the piston rod is forced through the tapering side walls, thereby being compressed, and forced outwardly through the nosecone aperture. The universal presence of compressed air facilities at commercial tire installation businesses and gas stations, insures that the present device can be widely used. Further, the present method and apparatus provides for valve stem removal and/or installation which is certain, quick, and efficient. Much time is saved because of extremely high, initial insertion success rate, as well as a result of the quickness of removal and insertion achieved using this method and apparatus.

Accordingly, it is an object to the present invention to provide a method for removal of and installation of valve stems which is certain in its result and accomplished quickly and inexpensively.

Another object of the present invention is to provide apparatuses both for installing valve stems and removing valve stems, which apparatuses are inexpensive to manufacture, durable in structure, and efficient in operation.

Another object of the present invention is to provide a valve stem insertion tool which utilizes compressed fluid to force a valve stem into the opening of a rim from the outside wall of the rim.

Another object of the present invention is to provide an apparatus for inserting valve stem which is pneumatically actuated.

Another object of the present invention is to provide a pneumatically powered valve stem inserter which can easily be hand-held and utilized by one operator.

Another object of the present invention is to provide an externally powered valve stem insertion tool capable of being readily utilized at existing tire installation facilities.

Another object of the present invention is to provide a valve stem removal tool which ensures that no portion of the inoperable valve stem remains within the inflation chamber between the tire and the rim, upon removal of the valve stem.

Another object of the present invention is to provide a method for removing valve stems without damaging the rim opening.

Another object of the present invention is to provide a method for installing valve stems in which the valve stems are installed at a high rate of success.

Other objects, features and advantages of the present invention will become apparent from the following description when taken in conjunction with the accompanying drawings, wherein like characters of reference designate corresponding parts throughout the several views.

DESCRIPTION OF THE PREFERRED EMBODIMENTS

Figure 1:
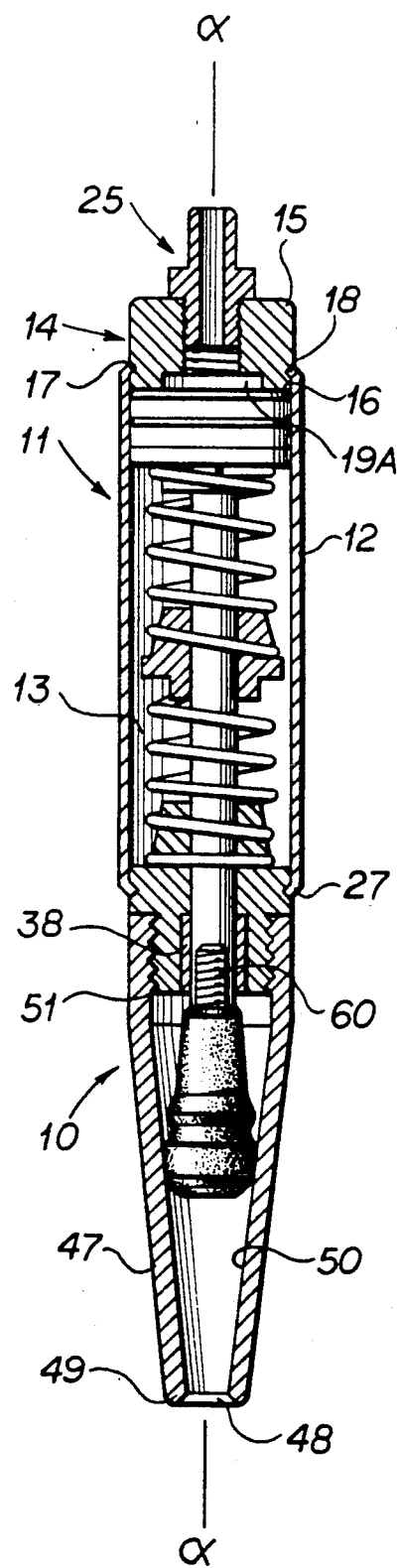
FIG. 1 is a longitudinal cross-sectional view of the valve stem inserter of the present invention.

Referring now to the embodiments chosen for the purpose of illustrating the present invention, FIG. 1 depicts a valve stem insertion tool, or inserter 10 having an elongate, tubular body 11. Tubular body 11 includes circular side wall 12 defining open, interior chamber 13 therein. As hereinafter described, in the preferred embodiment tubular body 11 constitutes an air cylinder. Sealing one end of tubular body 11 is end cap 14. End cap 14 includes disc-shaped portion 15 and opposing disc-shaped portion 16. Defined between disc-shaped portions 15 and 16 is annular channel 17. The diameter of disc-shaped portion 16 is such that portion 16 can be inserted into chamber 13, so that circumferential edge 18 of body 11 is adjacent to recess or channel 17. The diameter of portion 15 is slightly larger than the diameter of portion 16 so that when portion 16 is received in chamber 13, circumferential edge 18 abuts portion 15, as shown in FIG. 1. These elements are preferably made of impact and corrosive resistant materials, such as stainless steel. The tolerances of end cap 14 and body 11 are such that while portion 16 can be received in chamber 13, the engagement of these elements requires that body 11 and end cap 14 be machine press-fit, as is well known in the art. Such press fitting ensures that a air-tight seal is created between circumferential edge 18 and end cap 14. Further, press fitting these elements ensures that end cap 18 will not be disengaged from body 11 when chamber 13 is pressurized in accordance with the invention.

End cap 14 defines therethrough a passageway 19, which expands within portion 15 to form chamber 19A. Received in passageway 19 is hollow, tubular air fitting 25. Fitting 25 is adapted to communicate with a standard, quick coupling of pressurized pneumatic line assemblies (not shown) used throughout the automotive industry. Fitting 25 is received in passageway 19 by any suitable securing means, such as the communication of threads 26 with threads (not shown) defined by end cap 14 around passageway 19. Any other well-known means for anchoring tubular fitting 25 into end cap 14 can be utilized.

Figure 2:
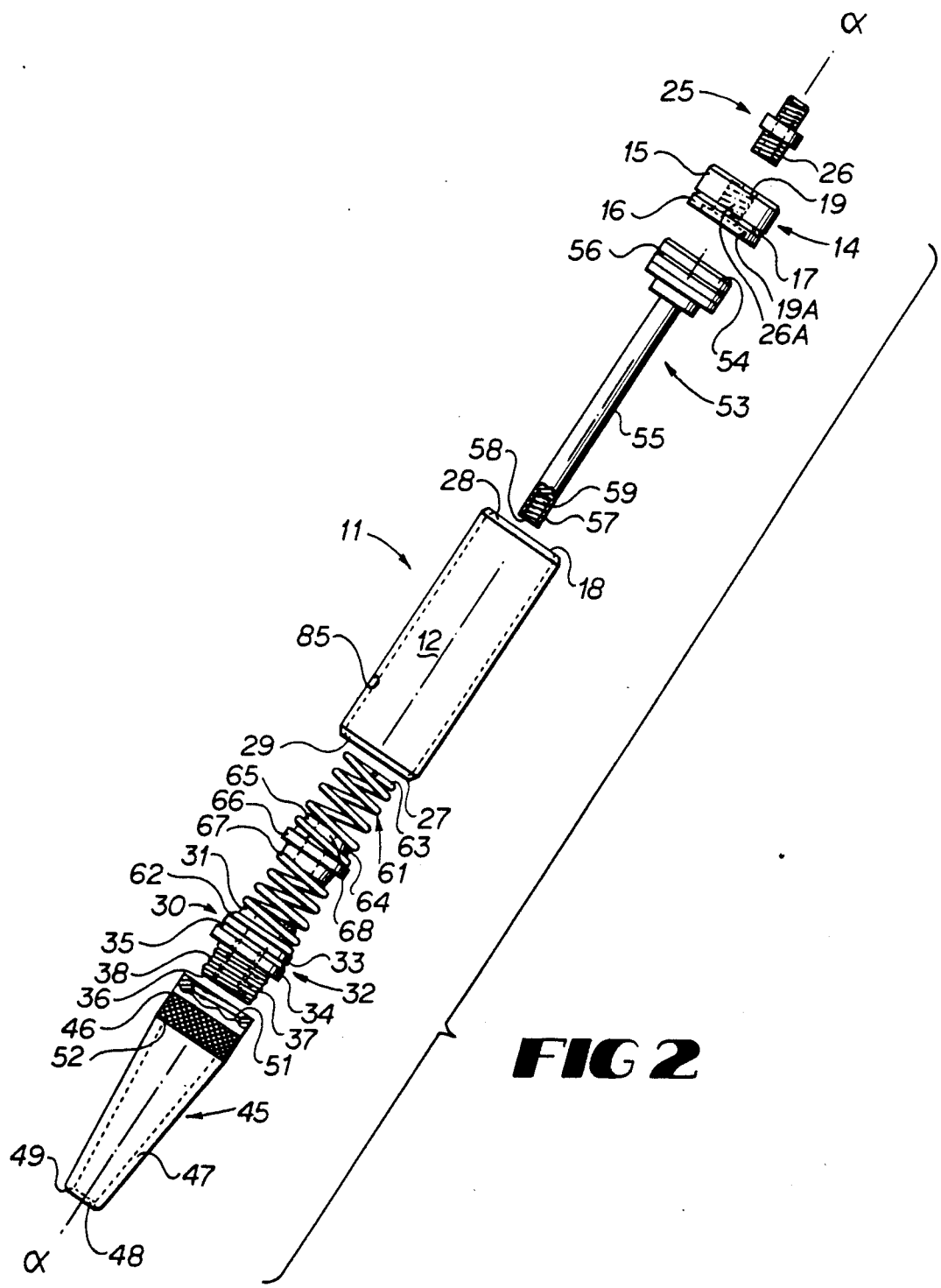
FIG. 2 is an exploded view of the embodiment of FIG. 1.

The end of tubular body 11 opposite that of circumferential edge 18 defines circumferential edge 27. As shown in FIG. 2, the opposing ends of tubular body 11 defining edges 18 and 27, respectively, each tapers identically between side wall 12 and circumferential edges 18 and 27, thus defining tapering edge portions 28 and 29. A second end cap 30 is partly received in chamber 13. End cap 30 has a tapering, cone-shaped inner flange 31, a middle, disc-shaped portion 32 having an inner, circumferential flange 33 and an outer circumferential flange 34 defining an annular channel 35 therebetween. Similar to the corresponding elements of end cap 14, the diameter of flange 33 is slightly less than the diameter of flange 34. Further, the diameter of flange 33 is such that flange 33 can be received into tubular body 11 with such close tolerances that end cap 30 must be machine press-fit onto body 11 until edge 27 abuts flange 34, creating an air-tight seal between edge 27 and flange 34. End cap 30 also defines an outer boss 36 having external threads 37. Passageway 38 is defined axially through end cap 30. Elongate, tubular bushing 39 defines passageway 40 therethrough. The outer diameter of tubular bushing 39 is such that it can be machine press-fit into passageway 38 so as to be immovable therein. A hollow, elongate, tapering tubular nosepiece or nosecone 45 is adapted to engage end cap 30. Nosecone 45 includes annular, cylindrical side wall 46 and tapering side wall 47 which defines aperture 48. Tapering side wall 47 also defines a reduced diameter tapered edge 49 around aperture 48. Side walls 46 and 47 define passageway 50 axially therethrough. Since side wall 47 is tapered or cone-shaped, Passageway 50 likewise tapers as passageway 50 approaches aperture 48. Side wall 46 also defines therein around passageway 50, internal threads 51. Threads 51 of nosecone 45 are adapted to be received in communication with threads 37 of end cap 30 to allow nosecone 45 to be readily, removably engaged to end cap 30. Machined or knurled surface 52 along the outside of nosecone 45 creates a rough surface to facilitate rotation of nosecone 45 about threads 37.

It is thus seen that the described assemblage of the above components results in the components being assembled along a longitudinal axis a.

Disposed within chamber 13, as shown in FIG. 1, is piston assembly 53, including piston 54 and piston rod 55. The diameter of piston 54 is such that piston 54 slides freely within tubular body 11. Annular gasket or seal 56 extends circumferentially around piston 54 so that gasket 56 contacts the side wall 12 of tubular body 11 as piston assembly 53 is disposed in chamber 13. When piston assembly 53 is retracted into valve stem inserter 10 until it contacts end cap 14, the free end 57 of rod 55 extends a small distance, for example, 1/4 inch, from outer boss 36. Open chamber 58 is defined by the free end 57 of piston rod 55. Internal threads 59 are also defined by piston rod 55 and are designed to communicate with the external threads 60 of a conventional valve stem.

Optionally provided in assembly 10 is tension means or coil spring 61, preferably disposed in chamber 13 so that coil spring 61 remains under tension when one end 62 abuts end cap 30 and the opposite end 63 abuts end cap 14. Disposed within coil spring 61 and around piston rod 55 is spring guide 64. Guide 64 is similar in shape to end cap 30 and includes tapered flange 65, central arcuate flange 66 and boss 67. Spring guide 64 defines therethrough passageway 68 which is larger in diameter than piston rod 55 to allow rod 55 to slideably move freely therethrough. Passageway 68 axially aligns with passageway 38 and is approximately of the same diameter as passageway 38.

Figure 4:
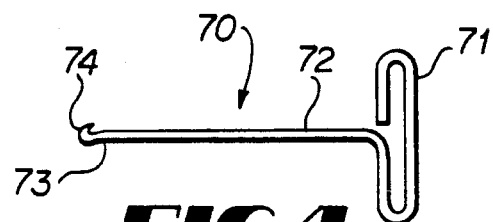
FIG. 4 is an elevational, perspective view of the valve stem remover of the present invention.

The tool for accomplishing the removal method is shown as removing tool or remover 70 in FIG. 4. Remover 70 is preferably made of a single piece of formed metal and includes handle 71, elongate shaft 72 mounted to or incorporated with handle 71 and is bent at lower end 73 to form grasping means or hook 74.

Figure 3:
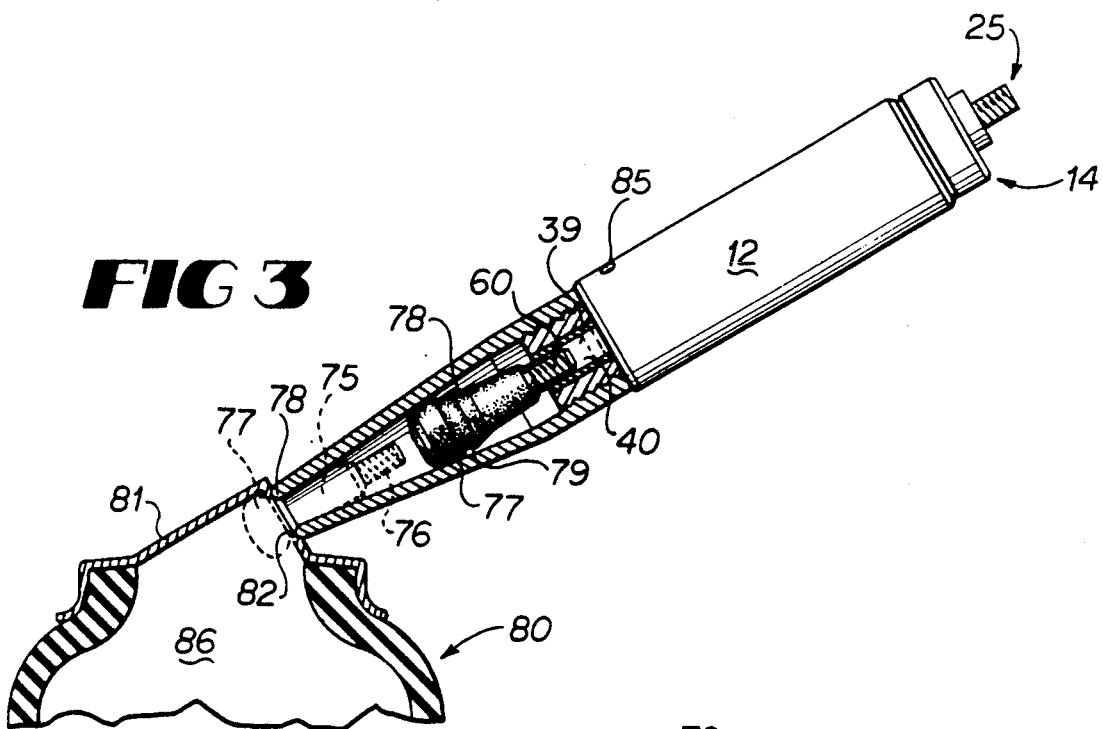
FIG. 3 is an elevational, perspective view of the embodiment of FIG. 1 in partial cross-section, depicting the valve stem insertion into the rim of a tubeless tire.

As previously discussed, inserter 10 is utilized to install a conventional valve stem such as stem 75 having an upper tubular cylinder 76 which includes external threads 60 and a lower, bulbous base 77. Above base 77 is a upperly tapering annular surface 78. An annular retaining channel or recess 79 is formed between base 77 and tapering surface 78. These elements comprise a conventional valve stem, well known in the art. To charge valve stem 75 into inserter 10, nosecone 45 is unscrewed from its attachment to end cap 30. A conventional valve stem 75 is threaded into the lower end 57 of piston rod 55 by engaging threads 60 with threads 59. A suitable lubricant optionally can be applied to the base 77. Nosecone 45 is reattached to end cap 34 by engaging threads 51 and 37. The charged inserter 10 and its associated elements are as depicted in FIGS. 1 and 3. Air from a conventional, pressurized pneumatic line (not shown) is applied to fitting 25, thereby pressurizing chambers 19A and 13 above piston 54 between piston 54 and end cap 14. This forces piston 54 away from end cap 14 and toward end cap 30, compressing spring 61 and forcing piston rod downwardly toward aperture 48. Simultaneously, therefore, valve stem 75 is forced downwardly through passageway 50 and against tapering side wall 47 toward aperture 48. The bulbous base 77 of valve stem 75 is thus compressed through the decreasing diameter of passageway 50. FIG. 3 shows valve stem 75 in its initial, charged position in inserter 10, and in phantom lines in an installed position in aperture 48. Only one valve stem 75 is charged at a time into inserter 10. As depicted in FIG. 3, a tubeless tire 80 includes a metal wheel or rim 81. Defined in rim 81 is a circular opening 82. The diameter of opening 82 is of a conventional length and is slightly smaller than the diameter of valve stem 75 at flange 79.

As shown in FIG. 3, for the installation of the valve stem into opening 82, inserter 10 is positioned so that tapering edge 49 of nosecone 45 is received in opening 82, and inserter 10 is thus aligned with rim 81 so that aperture 48 communicates with opening 82. As piston rod 55 continues to be forced out of chamber 13 and into passageway 50, valve stem 75 is forced through tapering passageway 50 and is compressed by side wall 47 until base 77 is of the approximate diameter as aperture 48. Continued movement of piston rod 55 out of chamber 13 pushes valve stem 75 through opening 82, so that tapering surface 78 and channel 79 are also pushed through opening 82. At this point, piston 54 reaches its downwardmost stroke and impacts spring guide 64 which, in turn, impacts end cap 30. This stops the downward movement of piston 54.

Side wall 12 defines transversely therethrough an aperture 85 which is positioned along side wall 12 to be between piston 54 and end cap 30 when piston 54 has reached its lowermost point of travel towards end cap 30. This allows the air in chamber 13 in front of piston 54 to escape from chamber 13 as piston 54 is forced towards end cap 30.

To complete the installation of a valve stem 75 into opening 82, valve stem 75 is pulled a small distance back out of the chamber 86 between rim 81 and tire 80, until channel 79 is held by rim 81 within opening 82. Base 77 and tapering surface 78 on either side of channel 79 thus secure valve stem 75 in place. The incorporation of rim 81 with valve stem 75 creates a seal therebetween. As valve stem 75 is now in proper position, inserter 10 is then rotated to unthread valve stem 75 from piston rod 55, thus completing the installation of valve stem 75.

Figure 5:
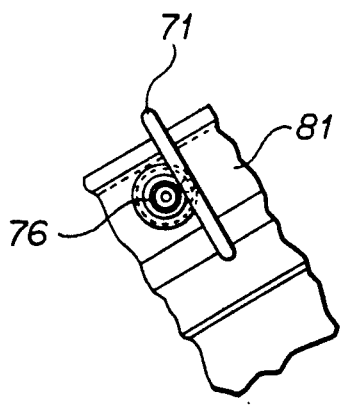
FIG. 5 is a top plan view of the embodiment of FIG. 4 shown inserted into a valve stem mounted to a wheel rim.
Figure 6:
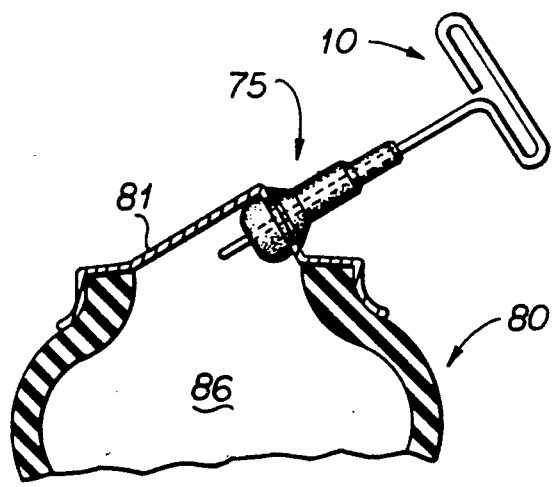
FIG. 6 is an elevational side view of the embodiment of FIG. 4 shown inserted to a valve stem mounted to a wheel rim.

This method is utilized either before any valve stem has ever been placed in the wheel rim or, more commonly, after an inoperable valve stem is removed from the wheel. For removal of an inoperable valve stem 75, removal tool or remover 70 is used. Remover 70 is inserted downwardly beside valve stem 75 by forcing shaft 72 along tubular cylinder 76 of valve stem 75 and along base 77, until hook or grasping means 74 enters chamber 86, as shown in FIGS. 5 and 6. Remover 77 is then pulled outwardly until hook 74 engages base 77. Continued outward force applied to remover 70 will pull valve stem 75 out of engagement with rim 81. This removal method accomplishes valve stem removal without damaging rim 81 around opening 82 or without shearing a portion of valve stem 75, thus preventing accumulation of valve stem debris in chamber 86. Subsequently, the installation of an operable valve stem 75 is accomplished as previously described.

Obviously, the present method of inserting a valve stem into a wheel rim can be accomplished using hydraulic pressure rather than pneumatic pressure. Rather than a pneumatic cylinder, as is described herein, a hydraulic cylinder assembly is substituted therefor to accomplish the movement of the piston and the piston rod out of the cylinder chamber. Whichever pressurized fluid is used, the inserter 10 will function properly without either spring 61 or without guide 64.

It will further be obvious to those skilled in the art that many variations may be made in the above embodiments here chosen for the purpose of illustrating the present invention, and full result may be had to the doctrine of equivalents without departing from the scope of the present invention, as defined by the appended claims.

what is claimed is:

1. An apparatus for installing a valve stem into an opening defined by a rim, comprising:
    (a) a cylinder assembly defining a first chamber;
    (b) fitting means mounted to said cylinder assembly for introducing fluid into said first chamber;
    (c) a piston disposed within said first chamber;
    (d) a piston rod having a first end and a second end and attached to said piston at said first end, said piston rod defining a second chamber and internal threads at said second end; and
    (e) a nonecone mounted to said cylinder assembly.

2. The apparatus defined in claim 1, and said piston being disposed for slidable movement within said chamber.

3. The apparatus defined in claim 1, and seal means mounted to said piston for engaging the interior side wall of said cylinder assembly when said piston is disposed in said chamber.

4. The apparatus defined in claim 1, and said piston being disposed in sealing relationship with the interior side wall of said cylinder assembly.

5. The apparatus defined in claim 1, and said cylinder assembly including a tubular cylinder having two ends, a first end cap attached in seal relationship to one end of said cylinder, and a second end cap attached to the other end of said cylinder.

6. The apparatus defined in claim 5, and said fitting means being mounted to said first end cap.

7. The apparatus defined in claim 5, and said second end cap defining a passageway therethrough.

8. The apparatus defined in claim 7, and a second tubular cylinder disposed within said passageway.

9. The apparatus defined in claim 1, and said piston rod being disposed concentrically within said cylinder assembly.

10. The apparatus defined in claim 1, and tension means disposed within said first chamber for applying force to said piston.

11. The apparatus defined in claim 10, said tension means including a spring.

12. The apparatus defined in claim 10, and a spring guide disposed within said first chamber.

13. The apparatus defined in claim 12, and said spring guide defining a passageway therethrough.

14. The apparatus defined in claim 13, and said piston rod projecting into said passageway.

15. The apparatus defined in claim 1, and a coil spring disposed within said first chamber.

16. The apparatus defined in claim 15, and a spring guide being disposed within said coil spring.

17. The apparatus defined in claim 1, said cylinder assembly defining external threads, and said nosecone defining internal threads for engaging said external threads.

18. The apparatus defined in claim 1, and said nosecone being cone-shaped and defining a passageway therethrough.

19. A tool for installing a valve stem into an opening defined by a wheel, comprising:
    (a) a cylinder having two ends and a side wall and defining a passageway therethrough;
    (b) a first cap attached to one end of said cylinder;
    (c) a fitting mounted to said first cap and communicating with said passageway;
    (d) a second cap attached to the other end of said cylinder;
    (e) a piston assembly slidably disposed within said cylinder, said piston assembly comprising a piston and a piston rod attached to said piston, and attachment means mounted to said piston rod for releasably attaching said valve stem to said piston rod; and
    (f) compression means attached to said cylinder for compressing said valve stem.

20. The apparatus defined in claim 19, and said compression means comprising a cone defining a tapering passageway therethrough.

21. The apparatus defined in claim 19, and tension means disposed within said side wall of said cylinder for urging said piston toward said first closure means.

22. An apparatus for installing a valve, comprising a cylinder assembly having a side wall defining a chamber, fitting means mounted to said cylinder assembly for introducing compressed air into said chamber, a piston assembly comprising a piston slidably received in said cylinder assembly and a piston rod attached to said piston for movement therewith, attachment means mounted to said piston assembly for releasably attaching said valve to said piston assembly, and compression means attached to said cylinder assembly for compressing said valve.

* * * * *